(12) United States Patent
Hayashi et al.

(10) Patent No.: US 11,654,952 B2
(45) Date of Patent: May 23, 2023

(54) STEERING DEVICE

(71) Applicant: AISIN CORPORATION, Kariya (JP)

(72) Inventors: Yuki Hayashi, Kariya (JP); Takaaki Koizumi, Kariya (JP)

(73) Assignee: AISIN CORPORATION, Aichi (JP)

( * ) Notice: Subject to any disclaimer, the term of this patent is extended or adjusted under 35 U.S.C. 154(b) by 749 days.

(21) Appl. No.: 16/684,742

(22) Filed: Nov. 15, 2019

(65) Prior Publication Data

US 2020/0156689 A1  May 21, 2020

(30) Foreign Application Priority Data

Nov. 16, 2018  (JP) .............................. JP2018-215768

(51) Int. Cl.
| | |
|---|---|
| *B62D 1/06* | (2006.01) |
| *B62D 1/04* | (2006.01) |
| *B60R 16/037* | (2006.01) |
| *H05B 3/20* | (2006.01) |
| *B60W 40/08* | (2012.01) |

(52) U.S. Cl.
CPC .............. *B62D 1/06* (2013.01); *B60R 16/037* (2013.01); *B60W 40/08* (2013.01); *B62D 1/046* (2013.01); *H05B 3/20* (2013.01)

(58) Field of Classification Search
CPC ...... B60R 16/037; B60W 40/08; B62D 1/045; B62D 1/06; B62D 1/065; H05B 1/0236; H05B 3/20; H05B 3/34
See application file for complete search history.

(56) References Cited

U.S. PATENT DOCUMENTS

| | | | |
|---|---|---|---|
| 10,308,273 B2 | 6/2019 | Naitou et al. | |
| 2010/0121530 A1* | 5/2010 | Suzuki | B62D 5/0457 701/41 |
| 2016/0101805 A1* | 4/2016 | Nishio | H05B 1/0236 219/204 |
| 2018/0327016 A1 | 11/2018 | Okazaki et al. | |

FOREIGN PATENT DOCUMENTS

| | | |
|---|---|---|
| JP | 2015033938 A | 2/2015 |
| JP | 2015128993 A | 7/2015 |
| JP | 2017187893 A | 10/2017 |
| WO | 2016185650 A1 | 11/2016 |

* cited by examiner

*Primary Examiner* — Dana Ross
*Assistant Examiner* — Joe E Mills, Jr.
(74) *Attorney, Agent, or Firm* — Buchanan Ingersoll & Rooney PC

(57) ABSTRACT

A steering device includes: a sensor drive unit configured to drive a sensor element provided in a steering to detect a gripped state of the steering; and a heater drive unit configured to drive a heater provided in the steering, in which the sensor drive unit executes driving of the sensor element periodically at an interval, the heater drive unit executes heater driving alternately with sensor driving by the sensor drive unit, and the interval of sensor driving is expanded in a state where the steering is gripped, compared with a state where the steering is not gripped.

17 Claims, 5 Drawing Sheets

STEERING DEVICE

CROSS REFERENCE TO RELATED APPLICATIONS

This application is based on and claims priority under 35 U.S.C. § 119 to Japanese Patent Application 2018-215768, filed on Nov. 16, 2018, the entire contents of which are incorporated herein by reference.

TECHNICAL FIELD

This disclosure relates to a steering device.

BACKGROUND DISCUSSION

In the related art, a vehicle steering wheel is provided with a sensor element for detecting the gripped state by a driver and a heating element (heater wire) for warming the steering wheel (a grip portion thereof). For example, Reference 1 discloses a circuit configuration in which an intermittent operation of a heater due to an operation of an automatic thermostat reduces influence on grip detection using a sensor element (capacitance sensor) provided in the steering wheel. Further, for example, Reference 2 discloses a configuration in which driving of the sensor element and driving of the heater are alternately performed (selectively switched). As a result, it is possible to detect the gripped state by a driver with high accuracy while warming the steering wheel.

However, in a vehicle, further improvement is being made to all components. Then, since the above-described steering device cannot always be said to satisfy a required level thereof by the configuration of the related art, there is still room for improvement in this respect.

Thus, a need exists for a steering device which is not susceptible to the drawback mentioned above.

SUMMARY

A steering device according to an aspect of this disclosure includes a sensor drive unit configured to drive a sensor element provided in a steering to detect a gripped state of the steering, and a heater drive unit configured to drive a heater provided in the steering, in which the sensor drive unit executes driving of the sensor element periodically at an interval, the heater drive unit executes heater driving alternately with sensor driving by the sensor drive unit, and the interval of sensor driving is expanded in a state where the steering is gripped, compared with a state where the steering is not gripped.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a first embodiment specifying a vehicle steering device will be described with reference to the drawings.

Figure 1:
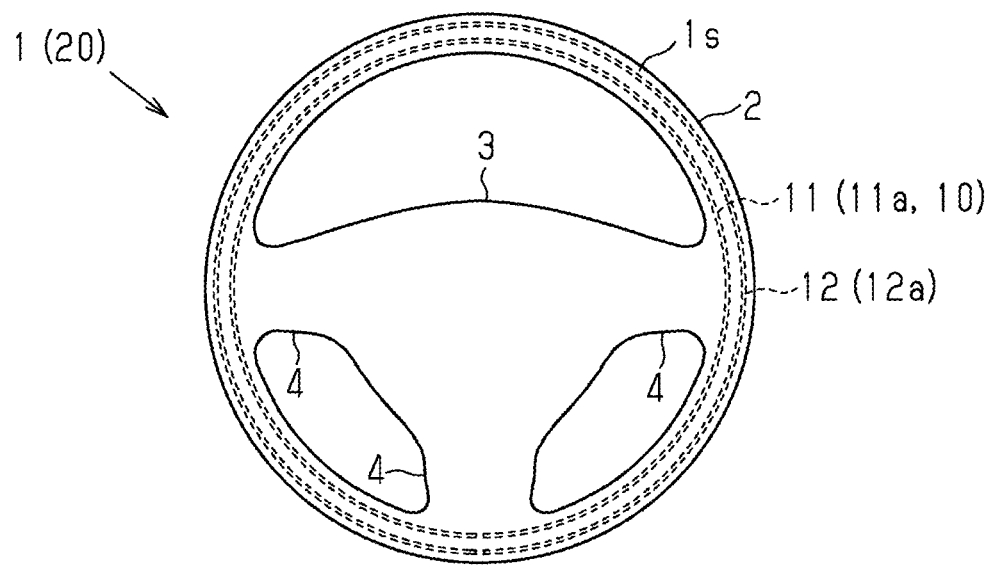
FIG. 1 is a front view of a steering.

As illustrated in FIG. 1, a steering wheel 1 of the present embodiment includes a rim 2 having a ring-shaped outer shape, the rim 2 being gripped by a vehicle occupant (driver), a hub 3 connected to a steering shaft (not illustrated), and three spokes 4 interconnecting the hub 3 and the rim 2 in a substantially T-shape. Then, the steering wheel 1 of the present embodiment is provided with a capacitance sensor 11 which functions as a sensor element 10 for detecting the gripped state by a driver and a heater 12 for warming the rim 2 as a grip portion.

Specifically, in the steering wheel 1 of the present embodiment, a sensor electrode 11*a* of the capacitance sensor 11 and a heater wire 12*a* of the heater 12 are respectively provided inside a skin 1*s* which covers the outer surface of the steering wheel 1. Moreover, the sensor electrode 11*a* and the heater wire 12*a* of the present embodiment are configured as separate elements independent of each other. Further, the sensor electrode 11*a* and the heater wire 12*a* are disposed over substantially the entire region in the direction in which the steering wheel 1 extends, specifically, the direction in which the rim 2 having an annular shape extends. In the present embodiment, a steering device 20 is thus configured to warm the steering wheel 1 and detect the gripped state of the steering wheel 1 by the driver.

Figure 2:
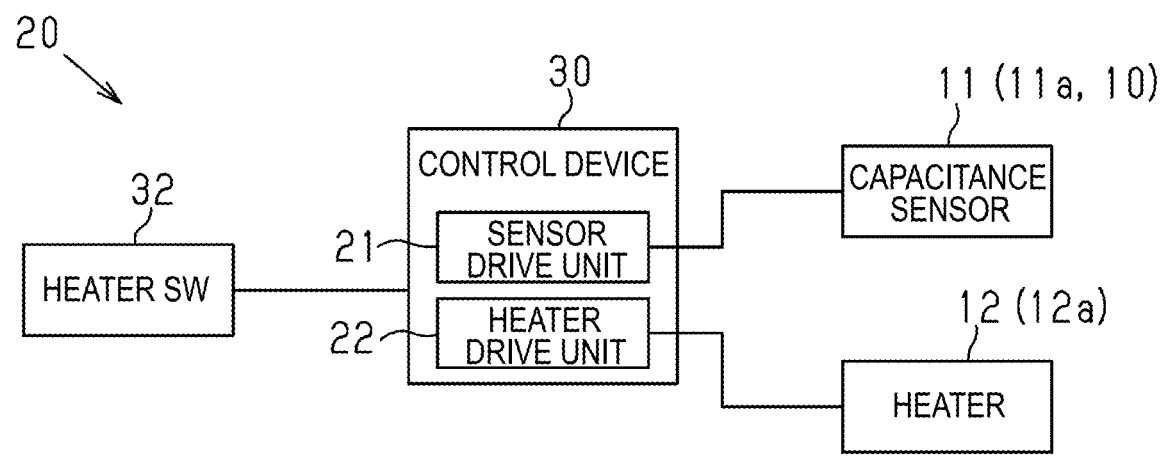
FIG. 2 is a block diagram illustrating a schematic configuration of a steering device.

Specifically, as illustrated in FIG. 2, the steering device 20 of the present embodiment includes a control device 30 including a sensor drive unit 21 which drives the capacitance sensor 11 as the sensor element 10 and a heater drive unit 22 which drives the heater 12. Further, a heater switch 32 is connected to the control device 30. Moreover, the heater switch 32 is provided, for example, at a position where the occupant inside a vehicle room is operable such as an instrument panel. Then, the control device 30 of the present embodiment is configured such that the heater drive unit 22 thereof executes driving of the heater 12, i.e., performs energization on the heater wire 12*a* on the basis of an operation input to the heater switch 32.

Figure 3:
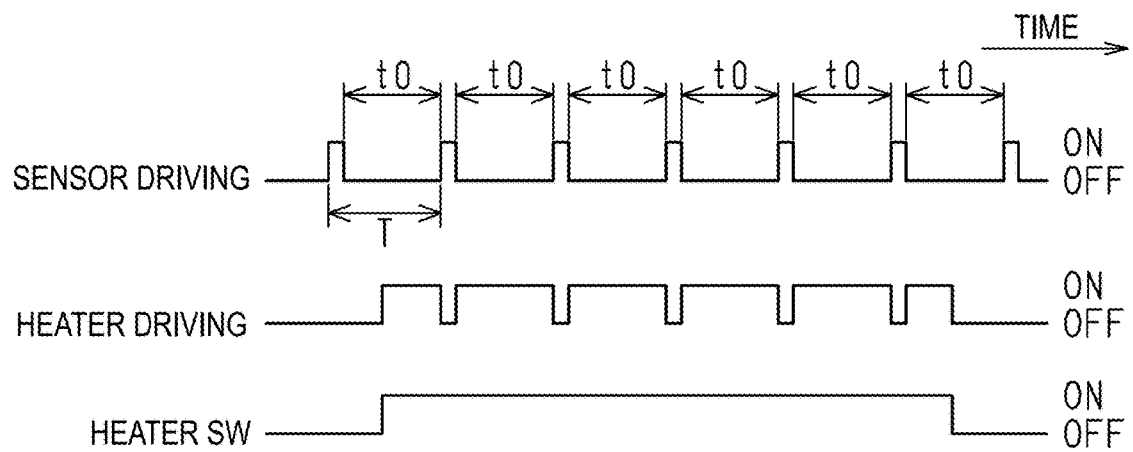
FIG. 3 is a timing chart illustrating an aspect of sensor driving and heater driving.

Further, as illustrated in FIG. 3, in the control device 30 of the present embodiment, the sensor drive unit 21 is configured to execute driving of the capacitance sensor 11 periodically at an interval. Then, the control device 30 of the present embodiment is configured to detect the gripped state of the steering wheel 1 on the basis of the detection result depending on the periodically performed sensor driving, i.e., a change in the capacitance of the sensor electrode 11*a* provided in the steering wheel 1 (the rim 2 thereof).

More specifically, the heater drive unit 22 of the present embodiment executes heater driving alternately with sensor driving by the sensor drive unit 21 described above. That is, the heater drive unit 22 executes heater driving in an interval during which the sensor drive unit 21 does not perform sensor driving. The steering device 20 of the present embodiment is thus configured to prevent execution of heater driving from affecting grip detection of the steering wheel 1 using the capacitance sensor 11.

Figure 4:
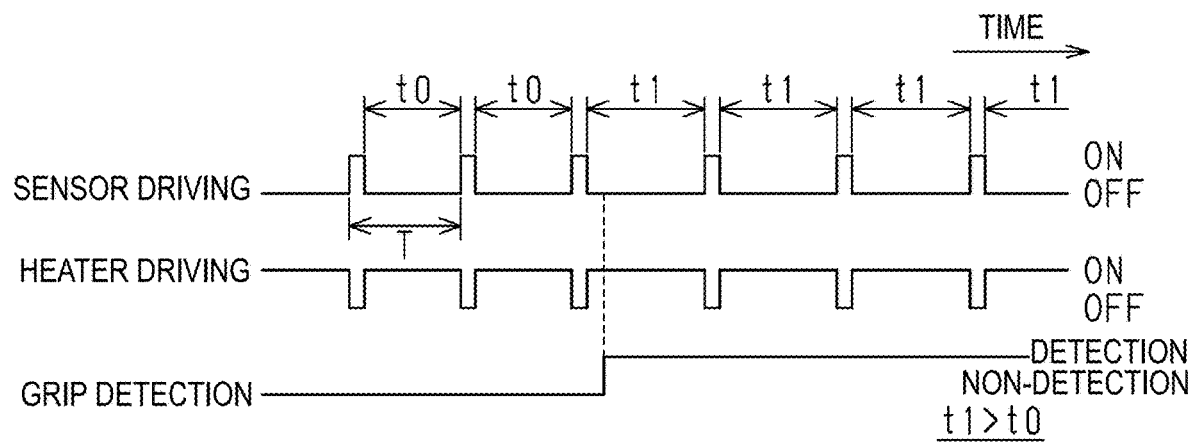
FIG. 4 is a timing chart illustrating an aspect of control of a change in the interval of sensor driving.

Further, as illustrated in FIG. 4, when determining that the steering wheel 1 is in a gripped state on the basis of the detection result using the capacitance sensor 11, the control device 30 of the present embodiment extends an execution period T of sensor driving by the sensor drive unit 21, compared with a state where the steering wheel 1 is not gripped. The steering device 20 of the present embodiment is thus configured such that the interval of sensor driving is expanded from "t0" to "t1" (t1>t0).

Next, actions and effects of the present embodiment will be described.

(1) That is, in the above-described configuration in which sensor driving and heater driving are alternately executed, when the interval of sensor driving is expanded (t0→t1), the execution time of heater driving is also extended (the rate at which heater driving is executed being increased). As a result, the steering wheel 1 gripped by the driver can be effectively warmed. Then, in addition to this, power saving can be achieved when the steering wheel 1 is not gripped.

(2) Further, in the configuration in which the capacitance sensor 11 is used for the sensor element 10, for example, when heater driving and sensor driving are performed at the same time, a possibility of affecting detection of the gripped state of the steering wheel 1 is increased. Accordingly, with the above configuration, the gripped state can be detected with high accuracy.

(3) The sensor electrode 11*a* and the heater wire 12*a* are configured as separate elements. Therefore, it is possible to more effectively prevent execution of heater driving from affecting grip detection of the steering wheel 1 using the capacitance sensor 11.

Second Embodiment

Hereinafter, a second embodiment specifying the vehicle steering device will be described with reference to the drawings. Moreover, for convenience of explanation, the same components as those in the first embodiment will be denoted by the same reference numerals, and a description thereof will be omitted.

Figure 5:
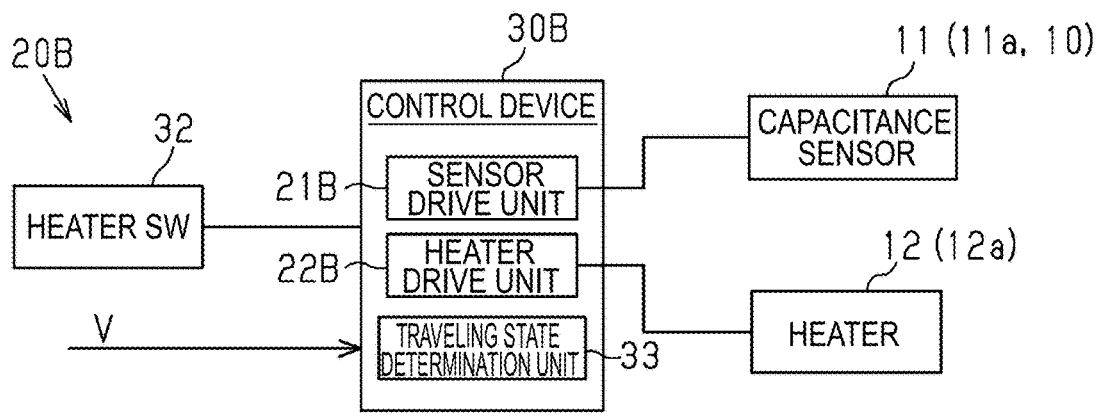
FIG. 5 is a block diagram illustrating a schematic configuration of a steering device according to a second embodiment.

As illustrated in FIG. 5, a control device 30B of the present embodiment includes a sensor drive unit 21B and a heater drive unit 22B, similarly to the control device 30 (see FIG. 2) of the first embodiment. Further, in a steering device 20B of the present embodiment, a vehicle speed V is input to the control device 30B. Then, the control device 30B of the present embodiment includes a traveling state determination unit 33 which determines a traveling state of the vehicle on the basis of the vehicle speed V.

Specifically, the traveling state determination unit 33 of the present embodiment determines that the vehicle is in a traveling state when the vehicle speed V exceeds a predetermined speed V0 (V>V0). Further, the traveling state determination unit 33 determines that the vehicle is stopped when the vehicle speed V is equal to or less than the predetermined speed V0 (V≤V0). Then, the control device 30B of the present embodiment is configured to change the interval of sensor driving by the sensor drive unit 21B on the basis of the determination result of the traveling state determination unit 33.

Figure 6:
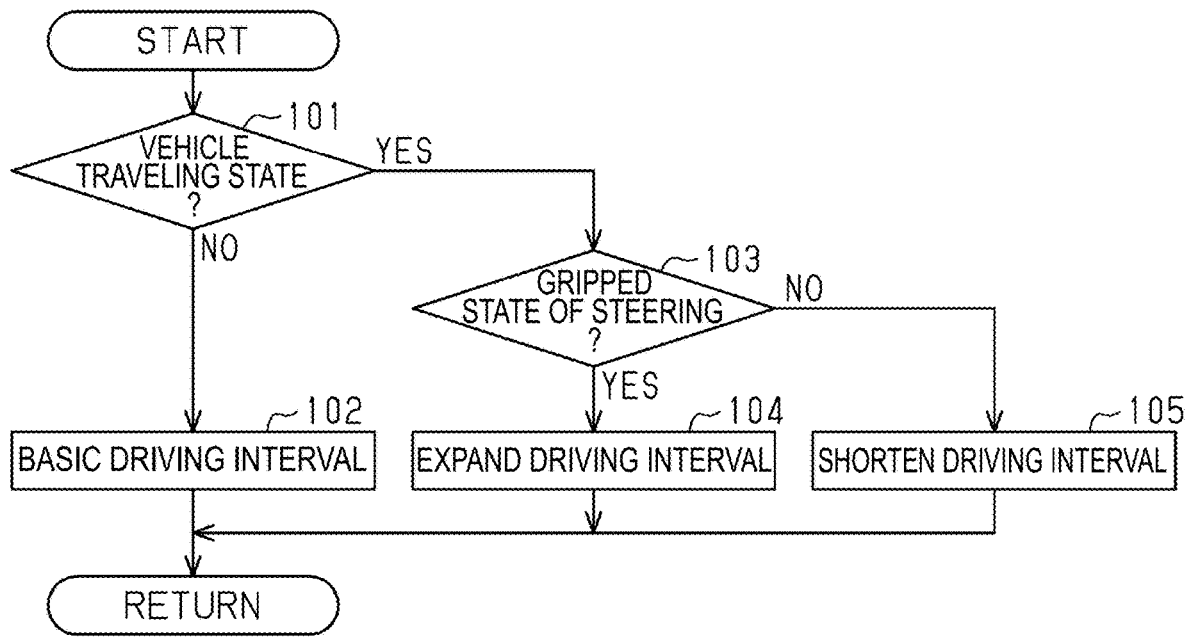
FIG. 6 is a flowchart illustrating a processing procedure of control of a change in the interval of sensor driving according to the second embodiment.

More specifically, as illustrated in the flowchart of FIG. 6, when the vehicle is not in a traveling state, i.e., in a stopped state (step 101: NO), the control device 30B of the present embodiment sets the execution period T of sensor driving so that the interval of sensor driving becomes "t2" (basic interval, step 102). Further, when it is determined in step 101 that the vehicle is driving (step 101: YES), the control device 30B of the present embodiment subsequently determines whether or not the steering wheel 1 is in a gripped state (step 103). Furthermore, in step 103, when the steering wheel 1 is in a gripped state (step 103: YES), the control device 30B sets the execution period T of sensor driving so that the interval of sensor driving is expanded to "t3" longer than the basic interval "t2" (t3>t2, interval expansion, step 104). Then, when the steering wheel 1 is not in a gripped state in step 103 (step 103: NO), the control device 30B of the present embodiment is configured to set the execution period T of sensor driving so that the interval of sensor driving is shortened to "t4" shorter than the basic interval "t2" (t4<t2, interval shortening, step 105).

Figure 7:
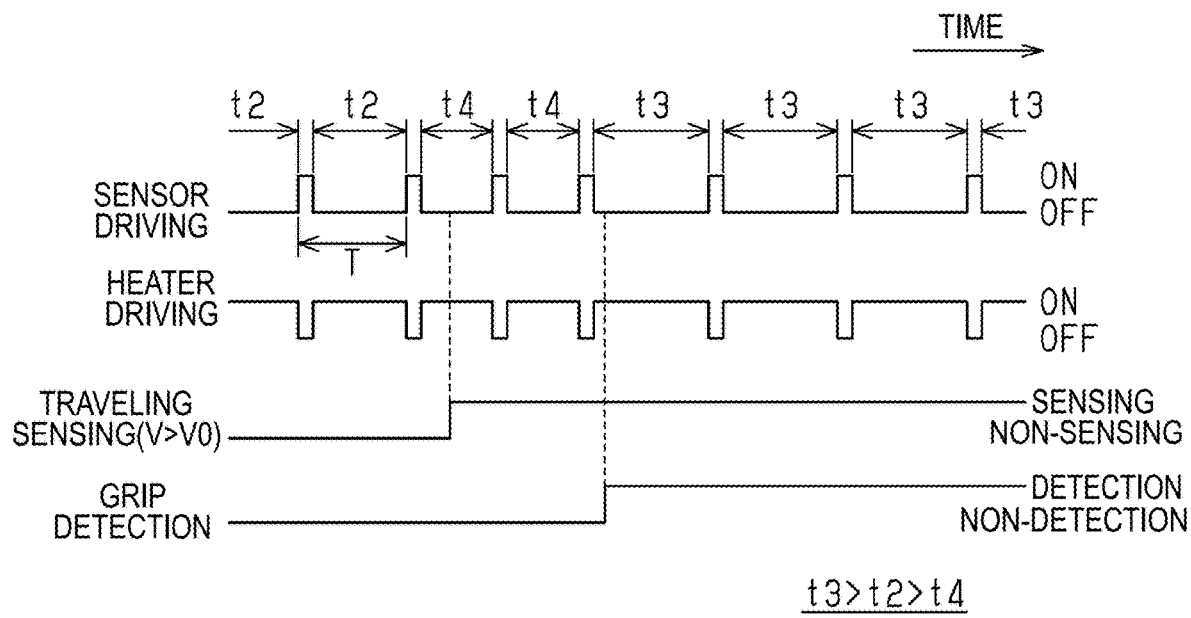
FIG. 7 is a timing chart illustrating an aspect of control of a change in the interval of sensor driving according to the second embodiment.

For example, as illustrated in FIG. 7, in a state where the vehicle is stopped and the steering wheel 1 is not gripped, the interval of sensor driving by the sensor drive unit 21B is set to "t2" as the basic interval. Further, when it is sensed thereafter that the vehicle is in a traveling state, the interval of sensor driving is shortened (t2→t4) by a combination with a state where the steering wheel 1 is not in a gripped state. Then, when it is detected thereafter that the steering wheel 1 is in a gripped state, the interval of sensor driving is expanded (t4→t3).

That is, in a state where the vehicle is in a traveling state and the steering wheel 1 is gripped, it is estimated that there is a high possibility of the gripped state being maintained thereafter. Accordingly, in such a case, the steering wheel 1 can be effectively warmed by expanding the interval of sensor driving and extending the execution time of heater driving.

Further, in a state where the steering wheel 1 is not gripped even though the vehicle is in a traveling state, it is estimated that there is a high possibility of the steering wheel 1 being gripped thereafter. Accordingly, in such a case, the gripped state of the steering can be determined with high accuracy by increasing the frequency at which sensor driving is executed.

Third Embodiment

Hereinafter, a third embodiment of the vehicle steering device will be described with reference to the drawings. Moreover, for convenience of explanation, the same components as those in the first embodiment will be denoted by the same reference numerals, and a description thereof will be omitted.

Figure 8:
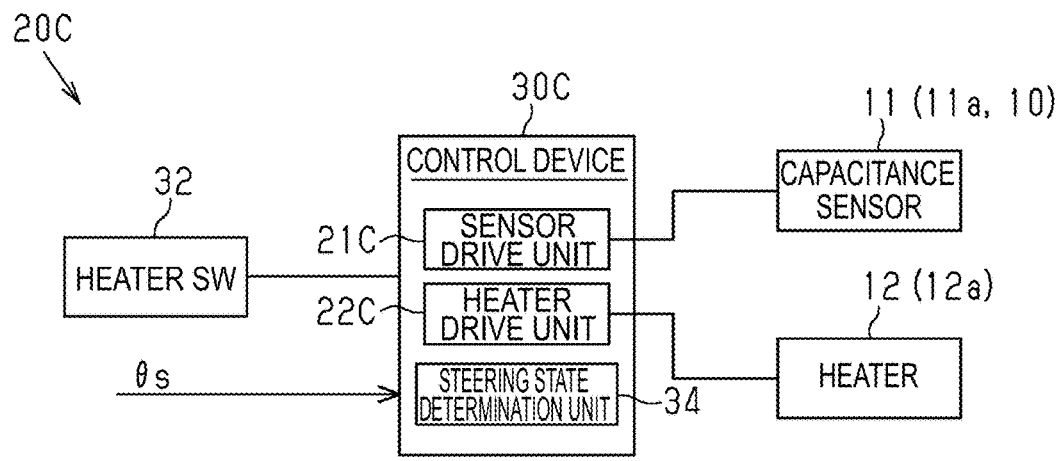
FIG. 8 is a block diagram illustrating a schematic configuration of a steering device according to a third embodiment.

As illustrated in FIG. 8, a control device 30C of the present embodiment also includes a sensor drive unit 21C and a heater drive unit 22C, similarly to the control device 30 (see FIG. 2) of the first embodiment. Further, in a steering device 20C of the present embodiment, a steering angle θs of the steering wheel 1 is input to the control device 30C. Then, the control device 30C includes a steering state determination unit 34 which determines the steered state of the steering wheel 1 on the basis of the steering angle θs.

In the control device 30C of the present embodiment, the steering state determination unit 34 determines that the steering wheel 1 is in a steered state when the steering angle θs (absolute value thereof) exceeds a predetermined angular range (|θs|>θ0). Further, when the steering angle θs (absolute value thereof) is within the predetermined angular range (|θs|>θ0), the steering state determination unit 34 determines that the steering wheel 1 is not in a steered state. Then, the control device 30C of the present embodiment is configured to change the interval of sensor driving by the sensor drive unit 21C on the basis of the determination result of the steering state determination unit 34.

Figure 9:
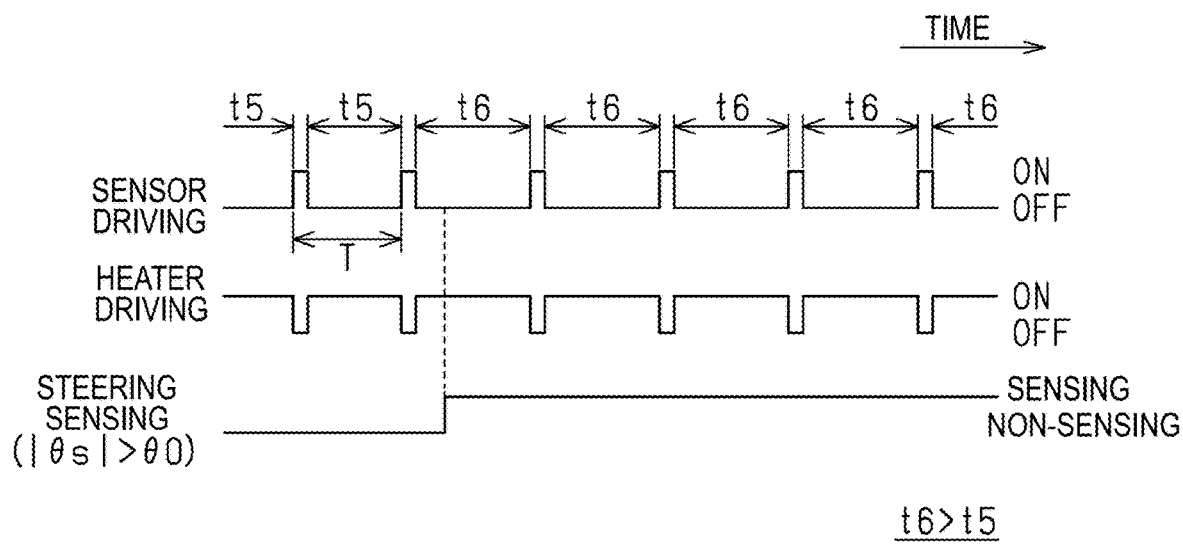
FIG. 9 is a timing chart illustrating an aspect of control of a change in the interval of sensor driving according to the third embodiment.

Specifically, as illustrated in FIG. 9, when it is sensed by an increase in the steering angle θs (absolute value thereof) that the steering wheel 1 is steered by the driver, the control device 30C of the present embodiment extends the execution period T of sensor driving by the sensor drive unit 21C, compared with a state where the steering wheel 1 is not operated. In the steering device 20C of the present embodiment, the interval of sensor driving is thus expanded from "t5" to "t6" (t6>t5).

That is, when the steering wheel 1 is in a steered state, it is estimated that there is a high possibility of the steering wheel 1 being in a gripped state. Then, it is estimated that there is a high possibility of the gripped state of the steering wheel 1 being continued thereafter. Accordingly, in such a case, the steering wheel 1 can be effectively warmed by expanding the interval of sensor driving and extending the execution time of heater driving.

In addition, the embodiment may be changed and implemented as follows. The above embodiment and following modifications may be implemented in combination with each other within a technically consistent range.

Figure 10:
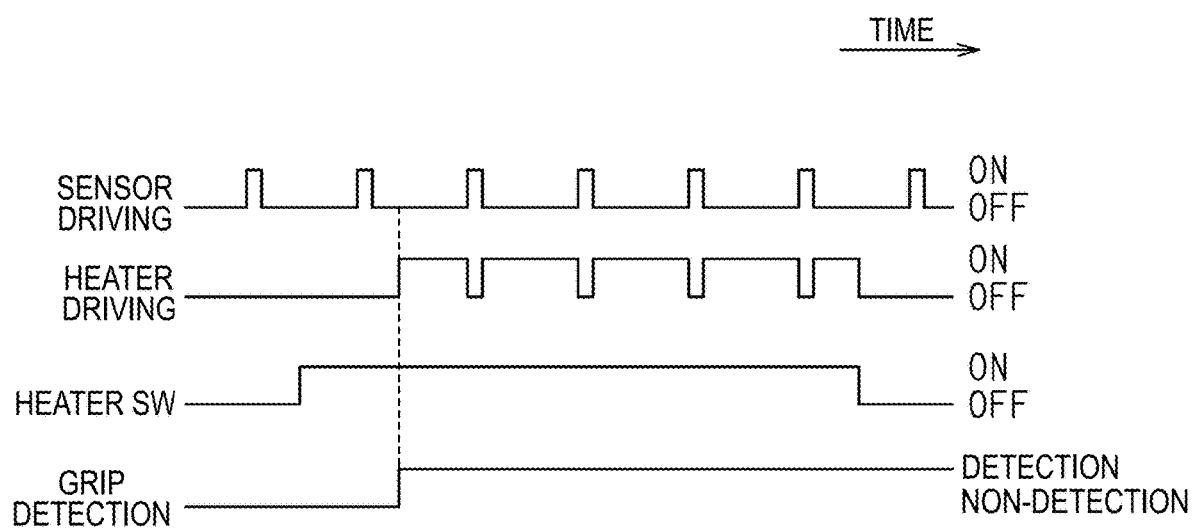
FIG. 10 is a timing chart illustrating another example of the timing at which heater driving is started.

In each of the above embodiments, heater driving is executed on the basis of an operation input to the heater switch 32, but, as illustrated in FIG. 10, heater driving may be started when it is detected that the steering is in a gripped state. Thus, the steering wheel 1 can be efficiently warmed and power saving can be achieved. Then, in this case, the heater switch 32 may not be provided.

In the second embodiment, the traveling state determination unit 33 determines that the vehicle is in a traveling state when the vehicle speed V exceeds the predetermined speed V0 (V>V0). However, the disclosure is not limited thereto, and traveling determination of the vehicle may be performed using, for example, a control signal or a state quantity of the vehicle such as a brake signal, a parking brake signal, an accelerator opening degree, or a shift state. Then, in the third embodiment, the steered state of the steering wheel 1 may also be determined using other vehicle state quantities or control signals.

In the second embodiment, when the steering wheel 1 is gripped even though the vehicle is stopped, the interval of sensor driving may be expanded, compared with a state where the steering wheel 1 is not gripped. Then, under a condition that the vehicle is in a traveling state, the interval of sensor driving may be extended when the steering wheel 1 is gripped, and in other words, the interval of sensor driving may not be extended when the vehicle is stopped.

In each of the above embodiments, the sensor electrode 11a of the capacitance sensor 11 and the heater wire 12a of the heater 12 are configured as separate elements. However, the disclosure is not limited thereto, and may also be applied to a configuration in which the sensor electrode 11a and the heater wire 12a are connected in a circuit. Then, the disclosure may also be applied to a configuration in which the sensor electrode 11a functions as the heater wire 12a.

In the above embodiment, the sensor electrode 11a and the heater wire 12a are disposed over substantially the entire region in the direction in which the steering wheel 1 extends, more specifically, in the direction in which the rim 2 serving as a grip portion thereof extends, the number and arrangement of sensor elements 10 and heaters 12 provided in the steering wheel 1 may be arbitrarily changed.

In each of the above embodiments, the capacitance sensor 11 is used as the sensor element 10 for detecting the gripped state of the steering wheel 1, but the disclosure may also be applied to a configuration using, for example, any other sensor element 10 such as a pressure sensor. Then, the heater 12 may also be formed using, for example, a thermoelectric element such as a Peltier element.

In addition to changing the interval of sensor driving, an aspect of heater driving, specifically, the amount of energization current may be changed. For example, when the interval of sensor driving is expanded, an excessive increase in temperature can be prevented by decreasing the amount of energization current to the heater 12. Further, conversely, the steering wheel 1 can be rapidly warmed by increasing the amount of energization current to the heater 12 in accordance with expansion of the interval. Furthermore, when the interval of sensor driving is shortened, further power saving can be achieved by decreasing the amount of energization current to the heater 12. Then, conversely, a reduction in temperature can be prevented by increasing the amount of energization current to the heater 12.

Next, a technical idea that may be grasped from the embodiments and modifications will be described.

(A) By a steering device in which the sensor element is a capacitance sensor and the capacitance sensor and the heater are provided as separate elements, it is possible to more effectively prevent execution of heater driving from affecting grip detection of a steering wheel using a capacitance sensor.

A steering device according to an aspect of this disclosure includes a sensor drive unit configured to drive a sensor element provided in a steering wheel to detect a gripped state of the steering wheel, and a heater drive unit configured to drive a heater provided in the steering wheel, in which the sensor drive unit executes driving of the sensor element periodically at an interval, the heater drive unit executes heater driving alternately with sensor driving by the sensor drive unit, and the interval of sensor driving is expanded in a state where the steering wheel is gripped, compared with a state where the steering wheel is not gripped.

That is, in a configuration in which sensor driving and heater driving are alternately executed, when the interval of sensor driving is expanded, the execution time of heater driving is also extended. Accordingly, with the above configuration, the steering wheel gripped by the driver can be effectively warmed. Then, in addition to this, power saving can be achieved when the steering wheel is not gripped.

It is preferable that the steering device further includes a traveling state determination unit configured to determine a traveling state of a vehicle, and the interval of sensor driving is expanded in a state where the vehicle is in a traveling state and the steering wheel is gripped, compared with a state where the vehicle is stopped and the steering wheel is not gripped.

That is, when the vehicle is in a traveling state and the steering wheel is gripped, it is estimated that there is a high possibility of the gripped state being maintained thereafter. Accordingly, in such a case, the steering wheel can be effectively warmed by expanding the interval of sensor driving and thus, extending the execution time of heater driving.

It is preferable that the steering device further includes a traveling state determination unit configured to determine a traveling state of a vehicle, and the interval of sensor driving is shortened in a state where the vehicle is in a traveling state and the steering wheel is not gripped, compared with a state where the vehicle is stopped and the steering wheel is not gripped.

That is, in a state where the steering wheel is not gripped even though the vehicle is in the traveling state, it is estimated that there is a high possibility of the steering wheel being gripped thereafter. Accordingly, in such a case, the gripped state of the steering wheel can be determined with high accuracy by increasing the frequency at which sensor driving is executed.

It is preferable that the steering device further includes a steering state determination unit configured to determine a steered state of the steering wheel on the basis of a steering angle of the steering wheel, and the interval of sensor driving is expanded in a state where the steering wheel is steered, compared with a state where the steering wheel is not steered.

That is, when the steering wheel is in a steered state, it is estimated that there is a high possibility of the steering wheel being in a gripped state. Then, it is estimated that the gripped state of the steering wheel being continued thereafter. Thus, in such a case, the steering wheel can be effectively warmed by expanding the interval of sensor driving and thus, extending the execution time of heater driving.

In the steering device, it is preferable that the heater drive unit starts the heater driving when it is detected that the steering wheel is in a gripped state.

According to the above configuration, the steering wheel can be efficiently warmed and power saving thereof can be achieved.

In the steering device, it is preferable that an amount of energization current to the heater is changed in addition to changing the interval of sensor driving.

Thus, the heater can be optimally controlled according to the interval of sensor driving.

In the steering device, it is preferable that the amount of energization current to the heater is decreased when the interval of sensor driving is expanded.

Thus, an excessive increase in temperature can be prevented.

In the steering device, it is preferable that the amount of energization current to the heater is increased when the interval of sensor driving is expanded.

Thus, the steering can be rapidly warmed.

In the steering device, it is preferable that the amount of energization current to the heater is decreased when the interval of sensor driving is shortened.

Thus, further power saving can be achieved.

In the steering device, it is preferable that the amount of energization current to the heater is increased when the interval of sensor driving is shortened.

Thus, a reduction in temperature can be prevented.

In the steering device, it is preferable that the sensor element is a capacitance sensor.

That is, in a configuration using the capacitance sensor as the sensor element, for example, when heater driving and sensor driving are performed at the same time, there is a higher possibility of affecting detection of the gripped state of the steering. Accordingly, with the above configuration, the gripped state can be detected with high accuracy.

According to the aspects of this disclosure, it is possible to detect the gripped state by a driver while warming a steering more suitably.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering device comprising:
a controller including a sensor drive unit configured to drive a sensor element provided in a steering wheel to detect a gripped state of the steering wheel; and a heater drive unit configured to drive a heater provided in the steering wheel, wherein
the sensor drive unit executes driving of the sensor element periodically at an interval,
the heater drive unit executes heater driving alternately with sensor driving by the sensor drive unit, and
the interval of sensor driving is expanded in a state where the steering wheel is gripped, compared with a state where the steering wheel is not gripped.

2. The steering device according to claim 1, further comprising:
a traveling state determination unit configured to determine a traveling state of a vehicle, wherein
the interval of sensor driving is expanded in a state where the vehicle is in a traveling state and the steering wheel is gripped, compared with a state where the vehicle is stopped and the steering wheel is not gripped.

3. The steering device according to claim 1, further comprising:
a traveling state determination unit configured to determine a traveling state of a vehicle, wherein
the interval of sensor driving is shortened in a state where the vehicle is in a traveling state and the steering wheel is not gripped, compared with a state where the vehicle is stopped and the steering wheel is not gripped.

4. The steering device according to claim 2, further comprising:
a traveling state determination unit configured to determine a traveling state of a vehicle, wherein
the interval of sensor driving is shortened in a state where the vehicle is in a traveling state and the steering wheel is not gripped, compared with a state where the vehicle is stopped and the steering wheel is not gripped.

5. The steering device according to claim 1, further comprising:
a steering state determination unit configured to determine a steered state of the steering wheel on the basis of a steering angle of the steering wheel, wherein
the interval of sensor driving is expanded in a state where the steering wheel is steered, compared with a state where the steering wheel is not steered.

6. The steering device according to claim 2, further comprising:
a steering state determination unit configured to determine a steered state of the steering wheel on the basis of a steering angle of the steering wheel, wherein
the interval of sensor driving is expanded in a state where the steering wheel is steered, compared with a state where the steering wheel is not steered.

7. The steering device according to claim 3, further comprising:
a steering state determination unit configured to determine a steered state of the steering wheel on the basis of a steering angle of the steering wheel, wherein
the interval of sensor driving is expanded in a state where the steering wheel is steered, compared with a state where the steering wheel is not steered.

8. The steering device according to claim 1, wherein
the heater drive unit starts the heater driving when it is detected that the steering wheel is in a gripped state.

9. The steering device according to claim 2, wherein
the heater drive unit starts the heater driving when it is detected that the steering wheel is in a gripped state.

10. The steering device according to claim 3, wherein
the heater drive unit starts the heater driving when it is detected that the steering wheel is in a gripped state.

11. The steering device according to claim 5, wherein
the heater drive unit starts the heater driving when it is detected that the steering wheel is in a gripped state.

12. The steering device according to claim 1, wherein
an amount of energization current to the heater is changed in addition to changing the interval of sensor driving.

13. The steering device according to claim 12, wherein
the amount of energization current to the heater is decreased when the interval of sensor driving is expanded.

14. The steering device according to claim 12, wherein
the amount of energization current to the heater is increased when the interval of sensor driving is expanded.

15. The steering device according to claim 12, wherein
the amount of energization current to the heater is decreased when the interval of sensor driving is shortened.

16. The steering device according to claim 12, wherein
the amount of energization current to the heater is increased when the interval of sensor driving is shortened.

17. The steering device according to claim 1,
wherein the sensor element is a capacitance sensor.

* * * * *